United States Patent [19]

Umbarger et al.

[11] 4,197,461
[45] Apr. 8, 1980

[54] MINIATURIZED RADIATION CHIRPER

[75] Inventors: C. John Umbarger; Michael A. Wolf, both of Los Alamos, N. Mex.

[73] Assignee: The United States of America as represented by the United States Department of Energy, Washington, D.C.

[21] Appl. No.: 934,764

[22] Filed: Aug. 17, 1978

[51] Int. Cl.² ............................................. G01T 1/22
[52] U.S. Cl. .................................. 250/370; 340/600
[58] Field of Search ............... 250/336, 370; 340/600

[56] References Cited

U.S. PATENT DOCUMENTS

| | | | |
|---|---|---|---|
| 3,114,837 | 12/1963 | Thomas | 250/370 |
| 3,221,317 | 11/1965 | Ferrigno, Jr. | 340/600 |
| 3,878,496 | 4/1975 | Erickson | 340/600 |
| 3,999,071 | 12/1976 | Siffert et al. | 250/370 |

Primary Examiner—Alfred E. Smith
Assistant Examiner—Janice A. Howell
Attorney, Agent, or Firm—R. V. Lupo; Robert W. Weig; Paul D. Gaetjens

[57] ABSTRACT

The disclosure relates to a miniaturized radiation chirper for use with a small battery supplying on the order of 5 volts. A poor quality CdTe crystal which is not necessarily suitable for high resolution gamma ray spectroscopy is incorporated with appropriate electronics so that the chirper emits an audible noise at a rate that is proportional to radiation exposure level. The chirper is intended to serve as a personnel radiation warning device that utilizes new and novel electronics with a novel detector, a CdTe crystal. The resultant device is much smaller and has much longer battery life than existing chirpers.

5 Claims, 2 Drawing Figures

MINIATURIZED RADIATION CHIRPER

FIELD OF THE INVENTION

The invention relates to devices which emit audible sounds in response to radiation and more particularly to a miniaturized radiation chirper capable of emitting audible sound in response to radiation over large exposure and energy ranges.

BACKGROUND OF THE INVENTION

Detectors for emitting audible sounds when radiation impinges on or passes through their detection elements are well known to those working in environments where nuclear radiation can be hazardous. One of the earliest of such counters is the Geiger-Müller (G-M) counter which utilizes a gas filled tube. When one of the molecules of the gas in the tube encounters a gamma ray, it is ionized. The tube wall is the cathode while a positive central wire is the anode, the latter collecting the ionized electrons. The electrical pulse produced from the anode is passed through an amplifier and a speaker to produce an audible indication when radiation is encountered. Existing pocket chirpers use G-M tubes as described above. The electronics accompanying such tubes must amplify the pulses coming from the tubes before applying that signal to an integration circuit that measures the amount of radiation received. After a preselected amount of radiation has been received, the device discharges to an audible sound producing apparatus such as a speaker to give a chirp which indicates to the wearer that the given or selected amount of radiation has been encountered.

G-M tubes have two main drawbacks which are solved by the present invention. First, a gas-filled G-M tube has a low density and therefore requires a relatively large detection volume to achieve adequate sensitivity for normal low radiation fields. The cadmium telluride crystal of the invention, to the contrary, has a density of about 6.2 g/cc. For gamma ray and x-ray detectors this is a very high density and may be compared to iron, which is not a detector, but which has a density of 7.9 g/cc. Therefore, it can be seen that a very small CdTe crystal will have the same sensitivity as a much larger volume G-M tube. This illustrates that the invention greatly reduces the necessary size of an instrument for detecting radiation for the above-noted purpose. Second, the G-M tube requires a relatively high voltage supply, i.e., at least about 200 volts and higher, depending on the particular tube to be used. The CdTe crystal detector in accordance with the present invention, requires only a few volts that can be obtained directly from a small inexpensive battery. No high voltage electronic circuitry is necessary, thereby reducing circuit size, circuit complexity, and battery power requirements. It will also be appreciated by those skilled in the art that very poor energy resolution CdTe crystals can be utilized in the invention; after all, the G-M tubes presently used for such purposes possess no energy resolution at all. Therefore, poor quality CdTe crystals can be used in practicing the invention instead of the much more expensive high energy resolution crystals normally used for gamma ray spectroscopy purposes. A use therefore exists for normally unmarketable poor quality CdTe crystals.

SUMMARY OF THE INVENTION

In accordance with the present invention there is provided a miniaturized radiation chirper for use with a small battery pack suppling up to about 5.2 volts and up to 500 mA hours. The heart of the chirper is a poor quality CdTe crystal which is biased by the battery to produce an output signal in response to photon radiation within a large energy range such as from 30 to 1300 keV. Amplification circuitry produces a pulse when it receives a signal from the detector, caused by radiation exceeding a preselected threshold value; an audible sound is created when integrated energy stored in pulse receiving electronics exceeds a selected threshold amount. The rate of sound emissions is proportional to the radiation exposure level.

One object of the present invention is to give personnel working in areas containing radiation sources audible warning in proportion to encountered radiation levels.

Another object of the present invention is to provide detection for radiation within a broad energy spectral range.

One advantage of the present invention is that a preferred embodiment thereof is sufficiently rugged, yet sufficiently small and light weight, i.e., about 50 grams, to be clipped to the collar of working personnel by means of, for example, an alligator clip.

Another advantage is that the battery life is on the order of 2–3 months, as compared to several weeks to a month for existing "chirpers" with yet larger battery storage.

BRIEF DESCRIPTION OF THE DRAWINGS

Other objects and advantages of the present invention will be apparent to those skilled in the art from the following description with reference to the appended drawings wherein like numbers denote like parts and wherein.

DETAILED DESCRIPTION OF THE PREFERRED EMBODIMENT OF THE INVENTION

Cadmium telluride crystals have been used for several years in the field of gamma ray spectroscopy. In such uses the crystals must be of very high energy resolution and, therefore, carefully selected.

Because little energy resolution is needed to practice the invention, very poor low quality CdTe crystals can be used, i.e., those which are normally rejected by manufacturers as unsaleable. This means that crystals which are actually byproducts of the CdTe crystal producing industry are usable. Such crystals are relatively inexpensive.

Figure 1:
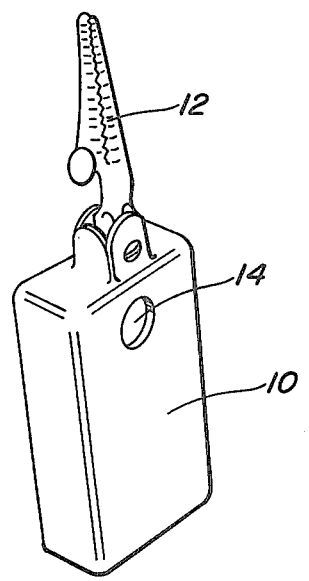
FIG. 1 is a view of a preferred embodiment of the invention encapsulated within a small plastic case affixed to a small alligator clip.

Pictured in FIG. 1 is a preferred embodiment of the invention encapsulated in a plastic case 10 which is affixed to an alligator clip 12. The plastic case 10 is very similar to cases which are used for typical radiation film badges except that there is a small orifice having a small speaker 14 embedded therein for emitting the chrip when threshold radiation is encountered by the wearer.

Figure 2:
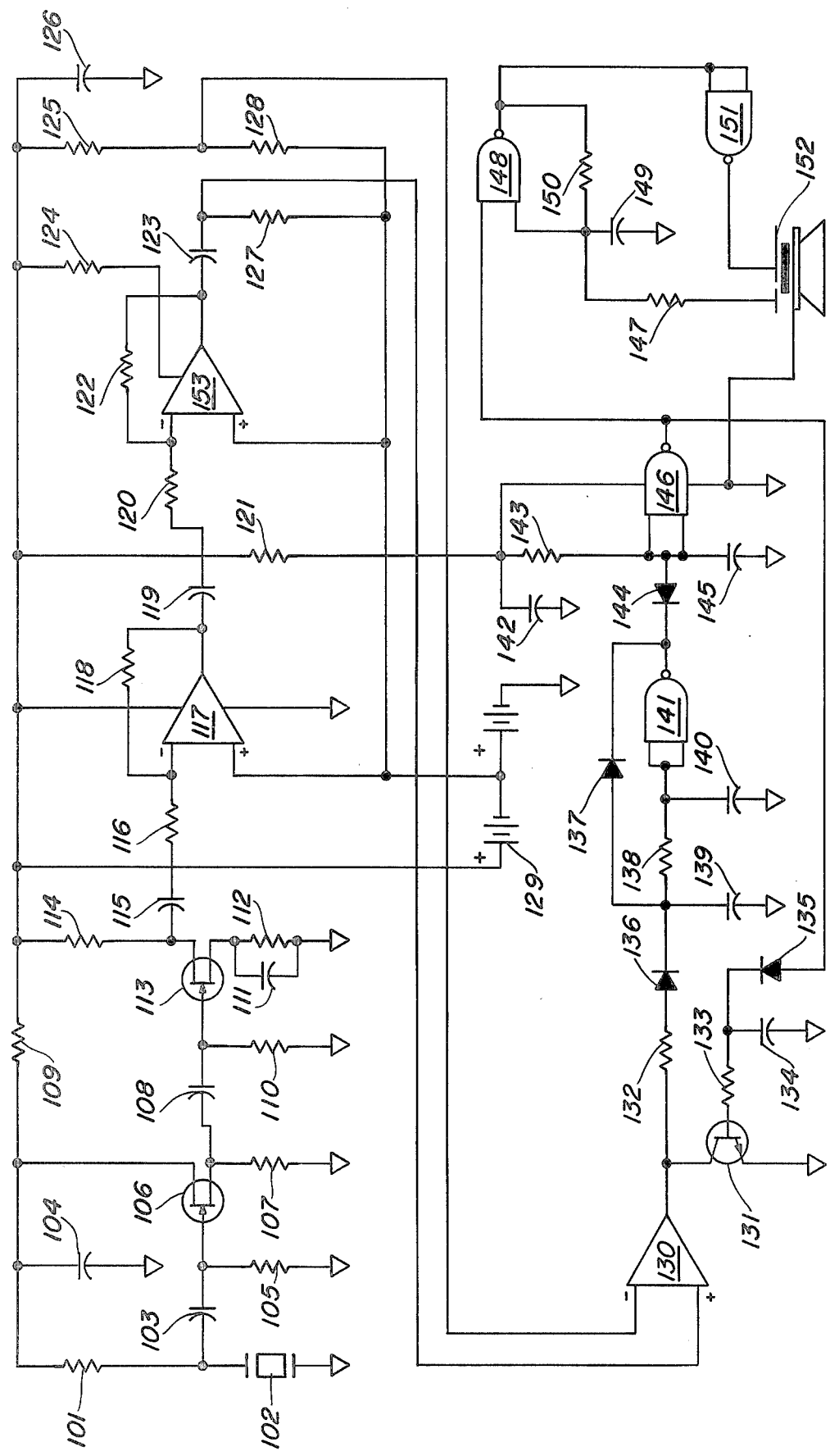
FIG. 2 schematically illustrates a preferred embodiment of the invention.

FIG. 2 illustrates a circuit which is used in accordance with the preferred embodiment of the invention.

A CdTe crystal 102 is impinged by radiation. As can be seen, a bias for the detector 102 is derived directly from a battery 129 through resistors 101 and 109. Voltage across the crystal 102 is on the order of 5.2 volts in the preferred embodiment. The detector outputs to a preamplifier comprising a source follower 106 and an amplifier 113. The preamplifier comprising source follower 106 and amplifier 113 is followed by two low power operational amplifier stages 117 and 153. The amplifier 153 outputs to a third operational amplifier 130 which functions as a fixed threshold discriminator or comparator. When a signal from operational amplifier 153 exceeds the threshold established by the resistive divider, operational amplifier 130 emits an output pulse. This pulse passes through resistor 132 and low leakage diode 136 to incrementally charge capacitor 139. When a sufficient number of pulses have been detected, the charge on capacitor 139 exceeds the upper threshold of the Schmidt trigger 141 which causes its output to go low. This removes the storage charge from capacitor 139 via another low leakage diode 137 and simultaneously discharges capacitor 145 connected to the input of the second Schmidt trigger or one shot gate 146 so that its output goes high. The output of gate 146 gates on oscillator 148 which drives the audio transducer 152. Feedback from audio transducer 152 to oscillator 148 maintains the frequency of oscillation at the most efficient frequency. The output of Schmidt trigger 146 also turns on transistor 131 which shuts off the comparator to prevent acoustic feedback. When the storage capacitor 139 discharges below the lower threshold of operation at amplifier 141 the latter's output goes high and capacitor 145 on Schmidt trigger 146 starts to charge. When the capacitor's charge reaches the upper threshold of Schmidt trigger 146 its output goes low and shuts off oscillator 148. After a short delay established by an RC network 133 and 134 on its base, transistor 131 turns off and allows the next pulse to start recharging capacitor 145.

Element 101 is a current sensing resistor for the detector 102. Element 103 is a signal coupling capacitor between the detector 102 and source follower 106. Elements 104 and 109 decouple power supply noise from the preamp whereas resistor 105 is a gate resistor for source follower 106. Resistor 107 is a source resistor for source follower 106 whereas capacitor 108 is a signal coupling capacitor between source follower 106 and first voltage amplifier stage 113. Resistor 110 is the gate resistor and resistor 112 is a source bias resistor and capacitor 111 is a source bias bypass capacitor. Resistor 114 is a drain load whereas capacitor 115 is a coupling capacitor between amplifier 113 and a low power operational amplifier 117 used as a voltage amplifier, the gain of which is set by resistors 116 and 118 at about −18. Resistor 121, capacitor 142 and capacitor 126 decouple the audio stages from the amplifier stages. Capacitor 119 is a coupling capacitor between operational amplifier 117 and element 153 which is a third voltage amplifier, its gain set at about − 100 by resistors 120 and 122. Resistor 124 is a bias resistor for amplifiers 117, 153, and 130. Capacitor 123 couples the signal between amplifiers 153 and 130 whereas resistor 127 provides zero level for the input to amplifier 130. Resistors 125 and 128 are a voltage divider which sets the threshold for comparator 130. When a signal exceeds the threshold voltage, the output of comparator 130 is a positive pulse charging a storage capacitor 139 through resistor 132 and diode 136. Resistor 132 sets the basic chirp rate and diode 136 prevents capacitor 139 from discharging when the output of comparator 130 goes low. Element 141 is a Schmidt trigger that senses the charge on capacitor 139. When the charge exceeds its upper threshold its output goes low discharging capacitor 139 through a diode 137. Resistor 138 and capacitor 140 provide a delay which ensures that capacitor 139 is completely discharged before Schmidt trigger 141 resets. Element 146 acts as a one shot to turn on the audio oscillator 148 which drives an audio transducer 152 through a driver 151. The timing of one shot gate 146 is selected by a resistor 143 and a capacitor 145. When Schmidt trigger 141 output goes low, capacitor 145 is discharged through a diode 144 causing the output of gate 146 to go high. When the output of Schmidt trigger 141 returns high capacitor 145 charges through resistor 143. When the charge exceeds the upper threshold of gate 146 (in approximately 50 ms) its output returns low. When gate 146 output is high, oscillator 148 is gated on. Its frequency is set by resistor 150, capacitor 149 and feed back from audio transducer 152 through a resistor 147. When gate 146 output is high it also charges capacitor 134 via diode 135 turning on transistor 131 via its base resistor 133. This shorts the output of the comparator during the audio pulse time preventing acoustical feedback. When the output of 146 returns low capacitor 134 keeps transistor 131 on for a short time to allow vibrations caused by the audio transducer to die out before turning on the detector circuitry. Diode 135 prevents capacitor 134 from discharging through 146.

The power consumption of the preferred embodiment is less than about 200 $\mu$A when silent and on the order of about 500 $\mu$A when chirping. Batteries having the characteristics of 4–6 volts at a capacity of 100–500 mA hrs are the most desirable batteries currently used. Battery life is on the order of about 2–3 months of continuous use. The circuit illustrated provides about 2 beeps a minute in a photon radiation field of 1 mr per hour. It will be appreciated by those skilled in the art that the beep rate is adjustable over a wide range, such as from about 50 beeps/min/mr/hr to about 0.1 beep/1 min/mr/hr.

Energies of photon radiation detected are from about 40 keV to about 1300 keV which are in the x-ray and gamma ray ranges. It is well known that the radiation in such ranges is very harmful to the human body and an early warning of being within a field which may be dangerous is very valuable.

It will be apparent to those skilled in the art that with an additional integration circuit and appropriate electronics a readout can be added to the existing circuit to allow the total radiation exposure value to be measured, stored and accumulated for a readout of total exposure to the body.

The various features and advantages of the invention are thought to be clear from the foregoing description. However, various other features and advantages not specifically enumerated will undoubtedly occur to those versed in the art, as likewise will many variations and modifications of the preferred embodiment illustrated, all of which may be achieved without departing from the spirit and scope of the invention as defined by the followings claims.

What we claim is:

1. A miniaturized radiation chirper with a small battery supplying on the order of 5.2 volts at about 500 mA hours, said chirper comprising:

a low quality CdTe crystal having poor energy resolution;

means for biasing said crystal with said battery so that an output signal is produced in response to photon radiation within a selected wide energy range impinging on said crystal;

means for producing a pulse when said radiation exposure exceeds a preselected threshold value;

means for receiving said pulse and for storing the electrical energy therefrom; and means for creating audible sound when the electrical energy stored in said pulses exceeds a threshold amount to indicate that a preselected radiation exposure has been accumulated.

2. The invention of claim 1 wherein said preselected threshold value is established by a resistive divider.

3. The invention of claim 1 wherein said pulse receiving and electrical energy storage means comprises a first capacitor.

4. The invention of claim 3 wherein said audible noise creating means comprises:

a first Schmidt trigger having an output which goes low when the energy stored in said first capacitor exceeds a selected upper threshold of said first Schmidt trigger.

5. The invention of claim 4 wherein said audible noise creating means further comprises:

a low leakage diode for removing energy stored in said first capacitor and a second capacitor charged by said discharging first capacitor connected to a second Schmidt trigger having an output going high in response to discharge from said second capacitor;

an oscillator operatively connected to said second Schmidt trigger; and, an audio transducer operatively connected to said oscillator.

* * * * *